Jan. 16, 1962     K. H. MUELLER     3,016,619
DEPTH AND GROOVE LOCATING GAGE
Filed Dec. 19, 1957
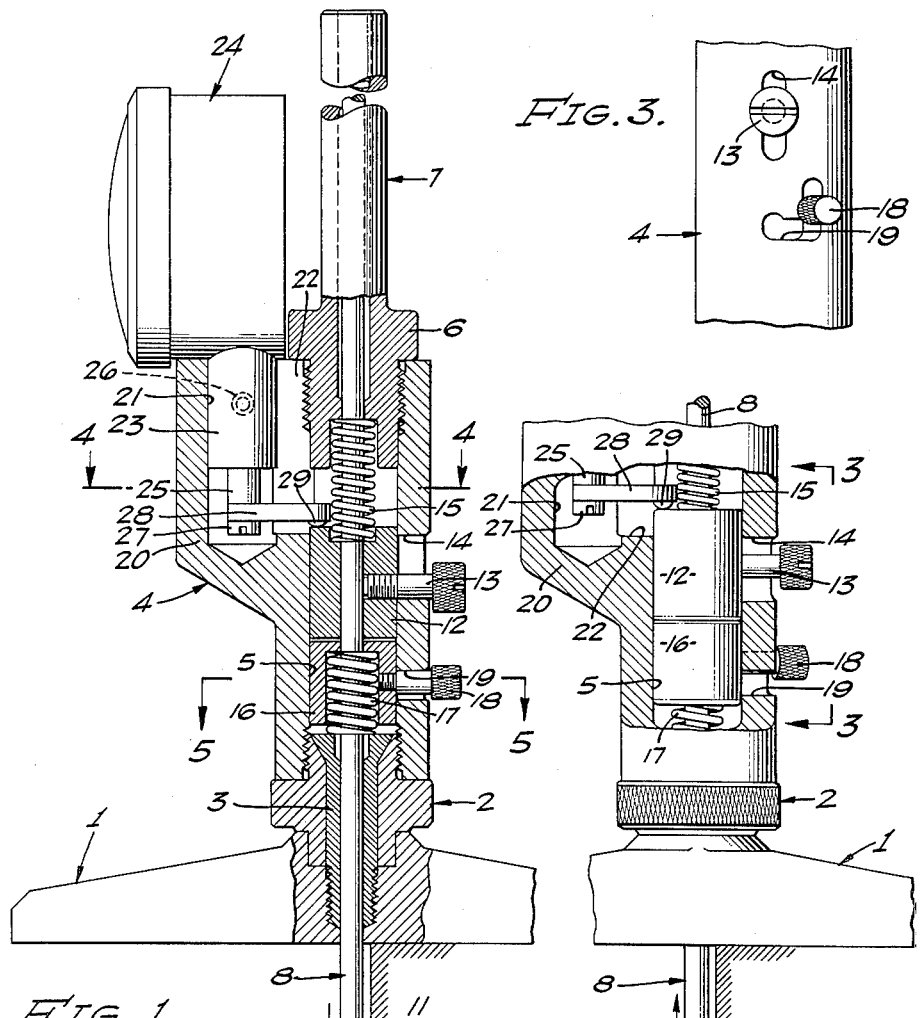
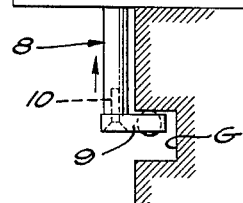
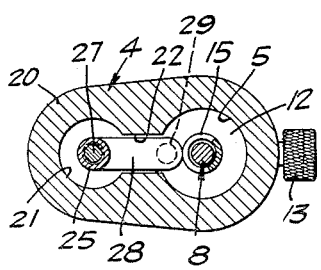
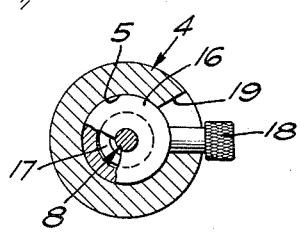
INVENTOR.
KURT H. MUELLER
BY
*Lyon & Lyon*
ATTORNEYS United States Patent Office 3,016,619
Patented Jan. 16, 1962

3,016,619
DEPTH AND GROOVE LOCATING GAGE
Kurt H. Mueller, 1052 N. Allen Ave., Pasadena, Calif.
Filed Dec. 19, 1957, Ser. No. 703,781
2 Claims. (Cl. 33—172)

This invention relates to depth and groove locating gages, and included in the objects of this invention are:

First, to provide a depth and groove locating gage wherein the probe member may be adjusted and preset to any desired length, and arranged for engagement with a dial indicator unit to indicate accurately deviations within the range of the dial indicator unit from the preset length.

Second, to provide a depth and groove locating gage having an offset end at the extremity of its probe arranged to enter a groove formed within a bore, and wherein the gage may be readily manipulated to measure from a reference surface to the far or near side of the groove.

Third, to provide a depth and groove locating gage which is provided with a unique, easily operated means for yieldably urging the probe bar outwardly from the gage or yieldably urging the probe bar toward the gage.

With the above and other objects in view, as may appear hereinafter, reference is directed to the accompanying drawings in which:

FIGURE 1 is an enlarged, fragmentary, partial elevational, partial longitudinal sectional view of the depth and groove locating gage showing its use as a depth gage, or to locate the far side of a groove relative to a reference surface;

FIG. 2 is a fragmentary, partial sectional, partial elevational view similar to FIG. 1, showing the gage used to locate the near side of a groove relative to a reference surface;

FIG. 3 is a fragmentary elevational view taken from the plane 3—3 of FIG. 2;

FIG. 4 is a transverse sectional view through 4—4 of FIG. 1;

FIG. 5 is a transverse sectional view through 5—5 of FIG. 1.

The depth and groove locating gage includes a base or anvil 1 in the form of a transverse bar, at the center of which is mounted an adapter collar 2 which is held in place by a tubular screw 3, preferably provided with a hexagonal socket at its head end. The upper end of the adapter collar 2 is externally screw-threaded to receive the lower end of a body or housing member 4. By means of the screw 3 the anvil may be adjusted to any desired angular relation with respect to the collar 2 and body member 4. The housing member is provided with a bore 5 coaxial with the bore and tubular screw 3. Screw-threaded into the upper end of the housing member 4 is an enlarged end 6 of a guard tube 7.

Slidably mounted and guided by the tubular screw 3 is a probe rod 8 which protrudes from the anvil 1 and extends through the housing member 4 into the guard tube 7. The extremity of the probe rod 8 protruding from the anvil 1 is provided with a lateral tip 9 in the form of a short bar secured to the end of the probe rod by a screw 10.

The lateral extremity of the tip 9 receives a ball member 11 which protrudes slightly from both axial ends of the tip 9. The ball member 11 is of predetermined and accurately known diameter, preferably some standard dimension which may be readily subtracted or added when dimensions are taken from opposite sides of the ball member 11.

Slidably mounted on the probe rod 8 is a collar 12 which is adapted to be adjustably secured along the length of the probe rod by a set screw 13. The set screw extends laterally through a slot 14 in the housing member 4. A spring 15 is interposed between the collar 12 and the screw-threaded end 6 of the guard tube 7 so that when the collar 12 is secured to the probe rod 8 the probe rod is urged outwardly from the anvil 1.

Slidably mounted on the probe rod 8 between the collar 12 and adapter collar 2 is a spring-containing sleeve 16. Mounted within the sleeve 16 and engaging the head end of the tubular screw 3 is a spring 17 which is stronger than the spring 15. Secured to the sleeve 16 is a laterally extending handle 18 which projects through a J-slot 19 in the side wall of the housing member 4. The J-slot is so arranged that when the handle 18 is in the shorter leg thereof the sleeve 16 is held in a lower position, rendering the spring 17 inoperative to counteract the spring 15; but when the handle 18 is in the longer leg of the J-slot 19, as shown in FIG. 2, the sleeve 16 bears against the underside of the collar 12.

The housing member 4 is provided at one side with a boss 20 having a socket 21 disposed parallel to the bore 5. The socket 21 communicates with the bore 5 by means of a slot 22. The socket 21 is adapted to receive a stem 23 which forms a part of the housing of a conventional dial indicator 24.

Slidably mounted within the stem 23 is a sensing rod 25. The sensing rod is urged towards its extreme position by a spring, not shown, within the dial indicator. The stem 23 is held in position by a set screw 26. Secured by a screw 27 to the end of the sensing rod 25 is a laterally directed bar 28 which projects through the slot 22 and is provided with a ball member 29 which engages the upper end of the collar 12.

Operation of the depth and groove locating gage is as follows:

When it is desired to use the gage as a depth gage or, for example, to locate the far side of a groove G, such as indicated in FIG. 1, the spring 17 is rendered inoperative by placing the handle 18 in the short leg of the J-slot 19. The probe rod 8 is extended by selecting a suitable setting of the collar 12 on the rod 8 to slightly more than the extended distance between the underside or reference surface of the anvil 1 and the far side of the ball member 11. Subsequent to this or prior to this operation, either the free distance or a selected dial indicator distance between the ball member 11 and the reference surface of the anvil 1 is measured by means of Johanson blocks or other distance measuring means. It should be noted that for this purpose the distance between the reference surface of the anvil 1 and either the near side or the far side of the ball member 11 may be measured if the diameter of the ball is a known distance.

If it is desired to measure the distance between the near side of a groove, or for that matter the thickness of an object, the handle 18 is placed in the longer leg of the J-slot 19 which allows the spring 17 to force the sleeve 16 against the collar 12. The calculated force of the spring 17 is in excess of the force of the spring 15 as well as the spring not shown within the conventional dial indicator 24.

The probe rod 8 is adjusted by means of the screw 13 set so that it extends a distance slightly less than the extended distance to be measured. The ball member 11 is inserted in the groove G or over the appropriate edge of an object to be measured by pressing downward on the opposite end of the probe rod 8 or by pressing downward on the set screw 13. When the set screw is released the spring 17 urges the near side of the ball member 11 against the near side of the groove, as shown in FIG. 2, and the dial indicator reading noted.

As in the first instance, either the setting between the ball member 11 and the reference surface of the anvil 1 for a given dial setting is noted, or the free distance is noted, so that the actual distance can be computed. If it is merely desirable to make comparative readings, rather than measure absolute distances as, for example, to determine whether or not a groove is located within a specified tolerance, it is not, of course, necessary to know the actual distance between the ball member 11 and the reference surface of the anvil 1.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A depth and groove location gage attachment for dial indicators having a mounting stem, a longitudinally movable sensing element, and a laterally extending sensing tip, said attachment comprising: a body structure having a longitudinal bore therethrough and a socket parallel to, offset from, and in lateral communication with said bore, said socket adapted to receive said stem with said sensing tip projecting laterally into said bore; tubular guide means closing the ends of said bore, one of said means having a reference surface; a probe rod slidably mounted in said bore, guided by said guide means, and projecting beyond said body structure, one end of said probe rod having a sensing element for cooperation with said reference surface; a collar slidably mounted, in said body structure bore, on said probe rod and engageable by the sensing tip of said dial indicator; a set screw for securing said collar at various locations on said probe rod, there being an accommodation slot for said set screw in the side wall of said body structure bore; a pair of opposed springs surrounding said probe rod, bearing on said guide means, and urging said collar in opposite directions, one of said springs being stronger than the other whereby said probe rod and collar tend to urge said dial indicator toward one extreme condition; means for compressing said stronger spring to a position clearing said collar thereby to permit said probe rod and collar to cause said dial indicator to move toward its other extreme position.

2. A depth and groove location gage attachment for dial indicators having a mounting stem, a longitudinally movable sensing element, and a laterally extending sensing tip, said attachment comprising: a body structure having a longitudinal bore therethrough and a socket parallel to, offset from, and in lateral communicaion with said bore, said socket adapted to receive said stem with said sensing tip projecting laterally into said bore; said body structure also having in the side wall of said bore a pair of longitudinal slots, one of said slots having a circumferential extension; a probe rod slidable in said bore; a pair of collars slidable on said probe rod; a set screw extending through one of said slots and through one of said collars to lock said collar on said probe rod; a latch means secured to the other of said collars and extending through the slot having the circumferential extension; a pair of opposed springs bearing against the distal ends of said collars, the spring bearing against the set screw secured collar being weaker than the other spring, whereby said other and stronger spring normally urges both of said collars and said probe rod in one direction, said latch means and circumferential slot extension adapted to hold said stronger spring in a compressed condition to permit limited action of said weaker spring.

References Cited in the file of this patent

UNITED STATES PATENTS

| 2,242,151 | Sisson | May 13, 1941 |
| 2,581,946 | Duesler | Jan. 8, 1952 |

FOREIGN PATENTS

| 521,811 | France | Mar. 15, 1921 |
| 121,769 | Sweden | May 25, 1948 |